US00RE35560E

United States Patent [19]

Simonelli et al.

[11] E Patent Number: Re. 35,560

[45] Reissued Date of Patent: Jul. 15, 1997

[54] FLUID STRAINER AND METHOD OF CONVERTING THE SAME BETWEEN MOTORIZED AND MANUAL MODES WITH PRESSURE-SENSITIVE SWITCH

[75] Inventors: James K. Simonelli, Maysville, Ky.; Alan J. Kuntz, Valleyview, Ohio

[73] Assignee: Vesper Corporation, Newtown Square, Pa.

[21] Appl. No.: 404,705

[22] Filed: Mar. 15, 1995

Related U.S. Patent Documents

Reissue of:

[64] Patent No.: 5,194,160
Issued: Mar. 16, 1993
Appl. No.: 745,875
Filed: Aug. 16, 1991

[51] Int. Cl.[6] ..... B01D 46/46; B23P 6/00; F16H 1/16

[52] U.S. Cl. ..... 210/741; 29/401.1; 74/425; 74/606 R; 210/90; 210/94; 210/329; 210/396; 210/460; 210/791

[58] Field of Search ..... 210/90, 94, 106, 210/107, 232, 329, 396, 407, 741, 784, 791, 239, 769; 74/412 R, 413, 425, 606 R; 29/401.1, 732

[56] References Cited

U.S. PATENT DOCUMENTS

| | | | |
|---|---|---|---|
| 864,664 | 8/1907 | Mild | 210/396 |
| 1,757,153 | 5/1930 | Thompson | 210/396 |
| 1,902,934 | 3/1933 | Acker | 74/425 |
| 2,084,955 | 6/1937 | Haught | 210/106 |
| 2,119,433 | 5/1938 | Haught | 210/106 |
| 2,183,578 | 12/1939 | McNeal | 210/107 |
| 2,243,559 | 5/1941 | Griffith | 210/107 |
| 2,305,351 | 12/1942 | Hellan | 210/396 |
| 2,354,752 | 8/1944 | Hellan | 210/329 |
| 3,278,038 | 10/1966 | Acker | 210/396 |
| 5,076,115 | 12/1991 | Dewachter et al. | 74/606 R |

*Primary Examiner*—Joseph W. Drodge
*Attorney, Agent, or Firm*—Caesar, Rivise, Bernstein, Cohen & Pokotilow, Ltd.

[57] ABSTRACT

An improved fluid-strainer is provided which makes provision for improved methods of converting the same between motorized and manual modes. Included in the fluid strainer is a gear motor housing for facilitating the conversion as well as inspection and removal means. Also provision is made for flushing of the fluid strainer so as to avoid cycle restart.

12 Claims, 3 Drawing Sheets

FLUID STRAINER AND METHOD OF CONVERTING THE SAME BETWEEN MOTORIZED AND MANUAL MODES WITH PRESSURE-SENSITIVE SWITCH

Matter enclosed in heavy brackets [ ] appears in the original patent but forms no part of this reissue specification; matter printed in italics indicates the additions made by reissue.

BACKGROUND OF THE INVENTION

The present invention relates to improved fluid strainers and to such strainers which facilitate conversion thereof between manual and automatic modes of operation.

Industrial strainer devices are well-known in the art for use in removing solid debris from in-line fluid flow conditions. One common type of industrial strainer is a so-called basket type which is physically disposed in a fluid line which supplies raw water to a fluid apparatus, such as a fire main pipeline. However, basket type strainers require the basket and the contents thereof to be removed. Such removal requires several hours of cleaning and labor time. Just as significantly the fluid system employing the basket strainer is down. Such down time presents, of course, added significant commercial drawbacks.

A significant improvement over such approaches is a fluid strainer apparatus, such as the type described in U.S. Pat. No. 3,278,038. These strainers are constructed and operated so as to be in-line and facilitate removal of solid particles in liquids flowing through pipelines by straining and subsequently scraping and flushing functions aimed at removing debris build-up on the strainer. Specifically, these strainers employ a peripheral in-flow strainer or screen, whereby solids are collected on an exterior surface of a perforated rotatable screen. A stationary scraper blade is positioned adjacent the rotatable screen so as to remove solid build-up from the exterior screen surface when the latter is rotated. For effecting cleaning, such screens are manually rotated or are driven by a motor. Some of the fluid strainers have collecting sump areas which hold the solids removed from the screen for subsequent removal from a waste discharge port during a sump flushing operation.

While the foregoing fluid strainer provides significant advantages, there is nevertheless a desire to improve upon their performances. For instance, the scraper blades when installed have pre-set clearances between the blades' scraping edge and the exterior surface of the rotating screen. Heretofore however, there was not a way of determining whether the predetermined clearances existed in fact. In addition, these fluid strainers have not been provided with any approach for allowing inspection and adjustment of the scraping blade's clearance, as well as allowing removal of objects which are difficult to scrape, such as leaves and the like.

Furthermore, many of the fluid strainers which are motorized have a motor driven worm gear arrangement which is coupled to the strainer's screen drive shaft by an external spur gear arrangement. The spur gear and the strainer screen drive shaft extend from the strainer's housing and are protected by a cage. The cage however does not entirely enclose the gear train system. Because of this construction, the gear train is bulky and many of the components are exposed to corrosive environmental factors and some of the rotating gears are exposed to the extent that they present potential safety concerns to operators.

Moreover, it is commercially desireable to provide a strainer apparatus which is easily convertible from a manual mode of operation to a motorized mode of operation. Successful approaches exist for achieving such conversion, such as the approach utilized with the HELLAN® fluid strainers that which are available from Cleveland Gear, Cleveland, Ohio, USA. These last noted type strainers achieve conversion by removal from the strainer of an entire manual handwheel assembly which includes not only the handwheel; but the handwheel's journal housing, hand wheel drive shaft, as well as rotatable screen and replacing them by a motorized drive system which includes a rotatable screen, a screen drive shaft, and a shaft journal housing. While successful approaches exist for conversion nevertheless there exists a desire to improve upon them.

SUMMARY OF THE INVENTION

Accordingly, it is an object of the present invention to provide a fluid strainer apparatus which overcomes drawbacks of the prior art, as well as provides for an improved operation thereof and which also facilitates greatly conversion thereof between manual and motorized modes.

In one illustrated embodiment, a fluid strainer apparatus is adapted to be coupled to a fluid line for removing solid debris suspended in the fluid. The strainer comprises a housing assembly defining an inlet means couplable to the fluid line for supplying fluid to the strainer and at least an outlet means for discharging strained fluid from the housing assembly. Included is a rotatably mounted fluid straining screen positioned adjacent the outlet means and a scraper blade mounted in the housing assembly in such a manner that a scraping edge thereof is adjustably spaced in close proximity to the screen for removing solids from the latter when it is rotated. The housing assembly includes an inspection means which is defined by a sealable inspection portion immediately adjacent the scraping blade. The inspection port is sealingly closed by an enclosure means. Removal of the enclosure means facilitates not only removal of any debris from the screen and the housing assembly, but allows adjustment of the adjustably mounted scraping blade so that the spacing between the blade and the screen can be adjusted.

In another illustrated embodiment, a fluid strainer apparatus is adapted to be coupled to a fluid line for removing solid debris suspended in the fluid. The strainer includes a cylindrical screen having a drive shaft rotatably mounted in the housing assembly. Included is motor means releasably coupled to the apparatus and operable for rotatably driving the screen drive shaft so that the scraper blade can clean the screen. The motor means includes a worm gear unit having a worm rotatably driven by a motor and a hollow shaft worm gear meshingly engages the worm. The hollow shaft worm gear is coaxially coupled to and rotatable with the screen drive shaft. The unit includes a pair of end plates each having internal hub portions which provide journalled surfaces for the hollow shaft worm gear. One of the end plates is threadedly attached to the strainer housing while the other plate encloses an end of the hollow worm gear and the screen drive shaft.

In another illustrated embodiment, a sealing means is housed in an open end of the hollow worm gear for sealingly protecting the meshing engagement of the worm and the hollow shaft worm gear.

In another illustrated embodiment, there is provided a method of convening a fluid strainer from manual operation to motorized operation comprising the steps of: providing a fluid strainer apparatus adapted to be coupled to a fluid line for removing solid debris suspended in the fluid, wherein the strainer comprises a housing assembly defining a fluid inlet means and at least an outlet means for discharging the fluid, a fluid straining means rotatably mounted in the housing assembly, a scraper blade mounted in such a manner that a scraping edge thereof is spaced in close proximity to the straining means so as to remove solids therefrom; providing a straining means which includes a cylindrical screen rotatably mounted in the housing assembly, a rotatable drive shaft journalled in the housing assembly and coupled to the screen so as to rotate the screen in response to rotation of the drive, and a handwheel attached to an end of the drive shaft extending from the housing assembly; removing the handwheel from the shaft; and attaching a motor means to the housing assembly wherein the motor means includes a motorized worm gear unit having a worm rotatably driven by a motor, a hollow shaft worm gear meshingly engaging and driven by the worm, wherein the worm gear shaft is keyed to the protruding end of the drive shaft so as to be coaxially coupled to and rotatable with the drive shaft.

To effect conversion of the motorized to a manual approach, the noted motor means is removed, whereby the internal hollow shaft worm gear is uncoupled from the end of the shaft and the handwheel is reattached to the drive shaft.

Among the other objects and features of the present invention are therefore: the provision of an improved strainer apparatus having means for facilitating inspection of a rotatable screen and the adjustment of a scraper blade; the provision of an improved compact motorized gear mechanism which is easily couplable to an end of the strainer drive shaft extending from the strainer housing; the provision of an improved method of converting a strainer from between manual and motorized modes; the provision of an improved method of flushing the strainer.

Other objects and further scope of applicability of the present invention will be made apparent upon a detailed description thereof when viewed in conjunction with the accompanying drawings thereof wherein like parts designate like reference throughout the several views.

DETAILED DESCRIPTION

Figure 1:
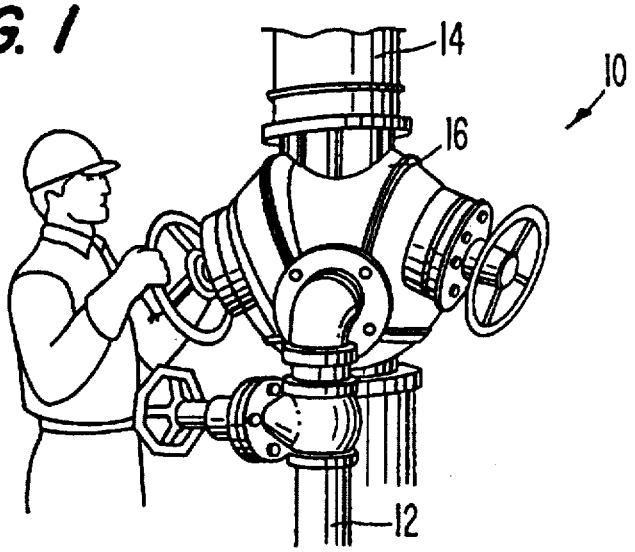
FIG. 1 is a perspective diagrammatic view of a fluid strainer including on aspect of the present invention.
Figure 2:
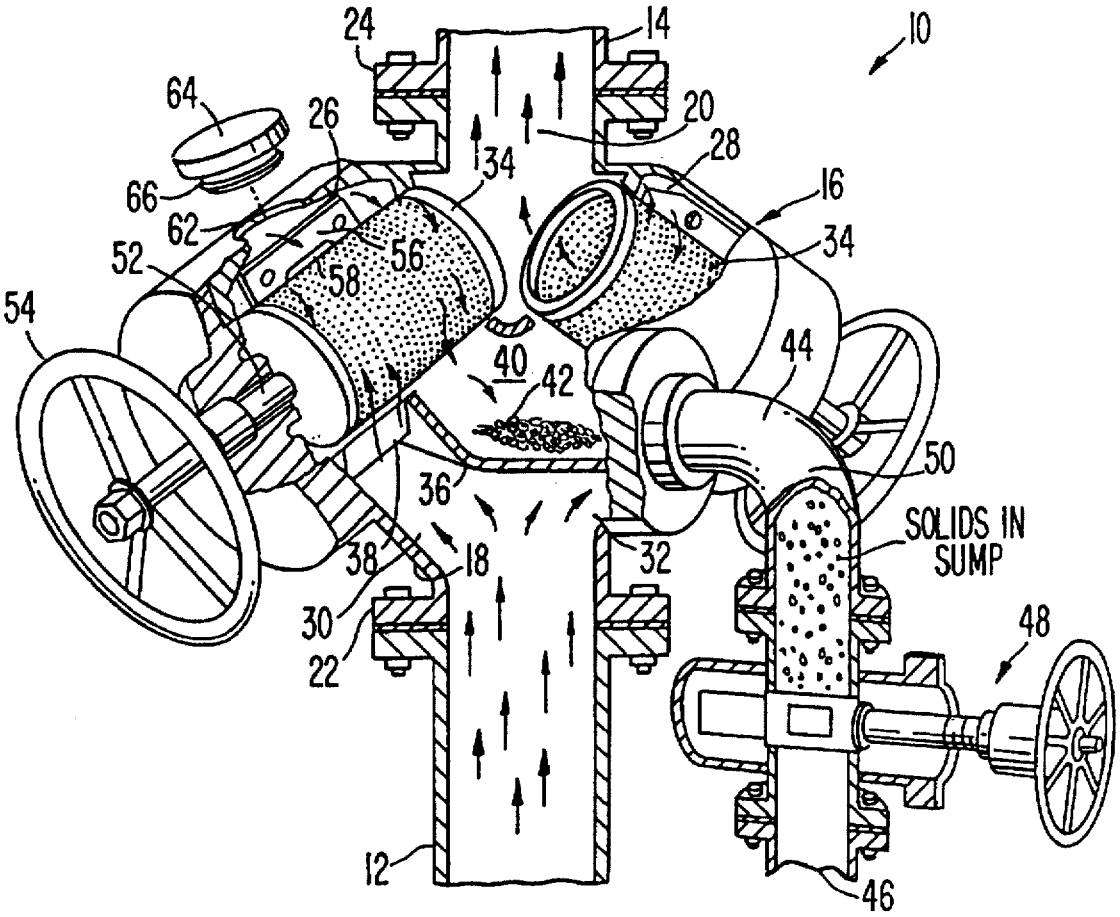
FIG. 2 is a perspective view of the strainer with parts thereof broken away.

Reference is made to FIGS. 1 and 2 for purposes of illustrating one preferred embodiment of a fluid strainer apparatus 10. The fluid strainer apparatus 10 is adapted to be coupled to an inlet pipe 12 which provides a pressure head of fluid, such as raw sea water. The fluid strainer apparatus 10 is also connected to a suitable fluid outlet pipe 14 which can supply strained fluid to a downstream application system, such as a fire main pipeline. The fluid strainer 10 effectively serves to function in-line so as to strain solids suspended in the raw water from entering the outlet pipe. Such strainers are known and can be obtained from Cleveland Gear, of Cleveland, Ohio, USA. One such kind is described in U.S. Pat. No. 3,278,038 and is incorporated herein by reference. Only futures of the strainer necessary for understanding the present invention will be set forth in the following description.

The fluid strainer 10 includes housing assembly 16 defining an inlet means 18 and an outlet means 20. The housing assembly 16 is provided with a flanged end 22 adjacent the inlet 18 for suitable attachments to an appropriate flange on the inlet pipe 12. A flange 24, is provided adjacent the outlet 29 for suitable attachment to a flange on the outlet pipe 14.

The housing assembly 16 is, preferably, a cast single piece member which includes wall portions defining a pair of chambers 26, 28 which are in fluid communication with diverting passages 30 and 32; respectively. Rotatably housed in each of the chambers 26 and 28 is a cylindrical strainer screen M which has end portions thereof rotatably mounted in wall portions 36, such as shown in FIG. 2. The size of the strainer perforations and the material of the strainers can vary depending upon the intended use and do not form an aspect of the present invention. A deflector rib 38 is connected to the internal strainer walls 40 and one is positioned in each of the passages 30 and 32. The deflector ribs 38 protect the screens from large objects in the raw water which might otherwise damage such screens. Referring back to the internal walls 40, they define a sump collection receptacle 42 which serves to collect and direct the strained sediment to a waste discharge outlet 44. The discharge outlet 44 is fluidly connected to a discharge pipe 46. A manually operated ball valve 40 in the discharge pipe 46 can be opened during a cleaning cycle when the outlet is closed as is known so as allow discharge of the collected solids from the strainer 10. Each of the rotatable strainer screens 34 is connected to a strainer drive shaft 52 that itself is journalled in the housing assembly 16 for rotation by a handwheel 54. Located in the chambers 26 and 28 is a stationary scraping blade 56 having a scraping edge 58 defining a predetermined gap or clearance with the periphery of the strainer screen 34. Adjustment bolts 60 allow adjustable securing of the scraping blade 56 relative to the straining screen 34. Some smaller sized strainers do not have adjustable scraper blades.

Figure 3:
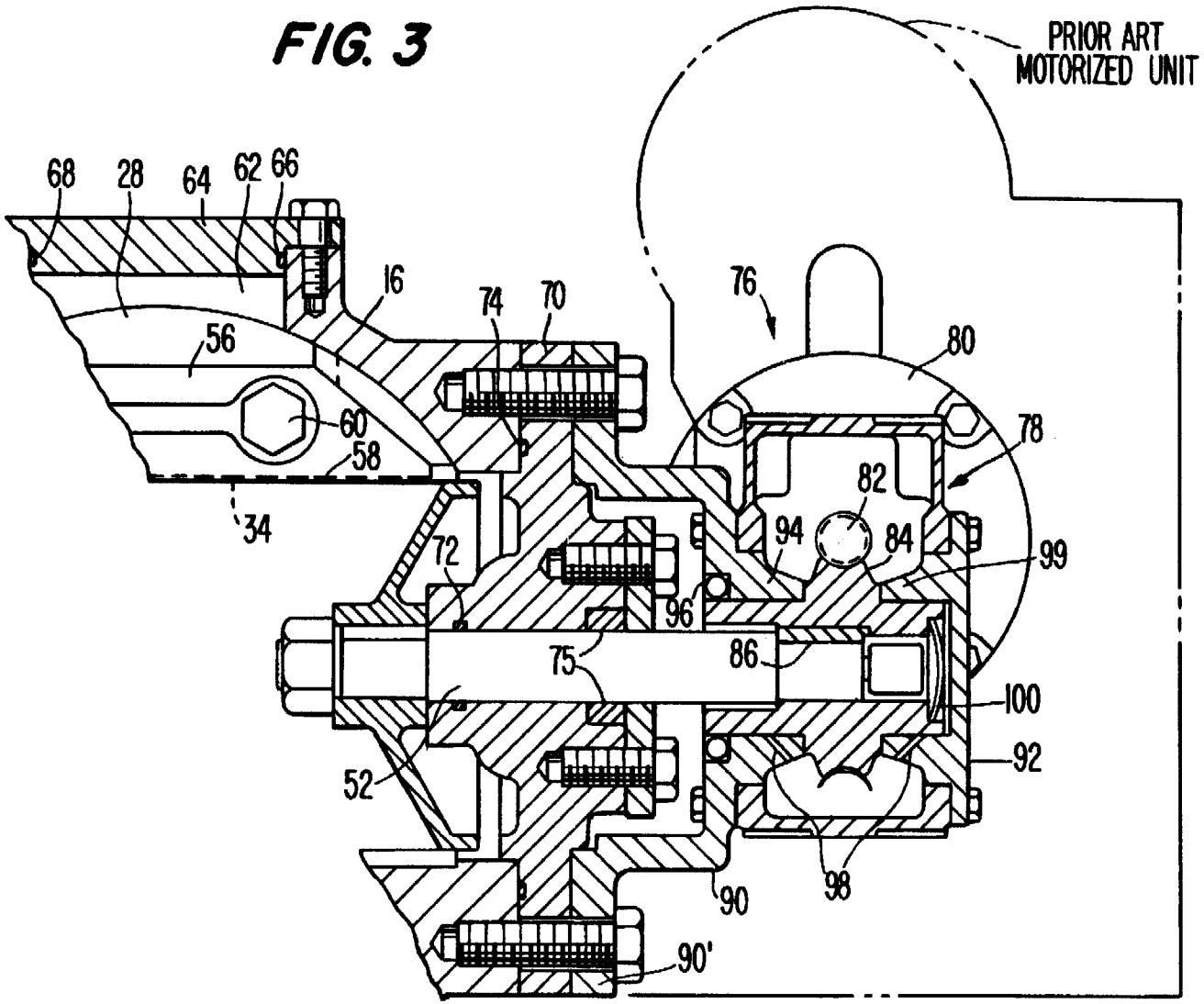
FIG. 3 is another illustrated embodiment of an automatic fluid strainer of the present invention.

As best seen in FIGS. 2 and 3, the portion of the housing assembly 16 which defines the chambers 26 and 28 includes enlarged inspection openings 62 situated immediately above the scraping blade 56 in each chamber. A sealable closure plate or member 64 is provided which includes a peripheral O-ring 66 on a reduced diameter portion 68 which has a snug fit with the opening 62. The closure plate 64 has a flange which is bolted to a flange on the housing assembly 16. The inspection opening 62 is sized to permit access to the scraping blade 56 as well as visual inspection of the screen 34 itself. An operator with suitable tools can manipulate the bolts 60 and adjust the blade 56, thereby adjusting the gap between the scraping edge 58 and the screen 34. It should be pointed out that the inspection port can be provided on manual type strainers (FIG. 2) and in the strainer embodiment as shown in FIG. 3.

Reference is now made to FIG. 3 for illustrating an improved motorized version of the fluid strainer apparatus 10. The housing assembly 16 includes plates 70 (only one of which is shown) adjacent an opening to chamber 26. The plate 70 includes an O-ring 72 contacting the drive shaft 52 and an O-ring 74 contacting the housing assembly. A conventional shaft capture collar assembly 75 is secured to the plate 70 and serves to limit axial displacement of the driving shaft 52. The O-rings 72, 74 advantageously provide desired sealing and are an improvement over known types of seals heretofore used in fluid strainers.

In this embodiment, a handwheel which was coupled to the drive shaft 52 has been replaced, simply and economically, by a detachable motorized gear unit which is directly coupled to the drive shaft. The motorized unit 76 includes a worm gear box or device 78 that is driven by a motor 80, such as a one-quarter horsepower motor. The worm gear box 78 includes a worm 82 suitably mounted therein for meshing engagement with a hollow shaft worm gear 84. The hollow worm gear shaft 84 is keyed by key 86 to one end of the drive shaft 52. A worm gear box housing 88 is provided which has end flanges that define an opening for receiving therein a pair of end plate members 90, 92. The housing 88 is threadedly secured to the plates 90, 92 as shown. The end plate 90 has a flange 90' which is threadedly secured to end plate 70 by bolts or the like. The end plates 90 and 92 respectively define axially inwardly extending hub arms 94 providing journal surfaces for the hollow shaft worm gear 84 (FIG. 3). The end plates 90, 92 serve to secure the worm gear 84 in the desired axial position. The end plate 90 is provided with a spring type shaft seal 96. The journal hub arms 94 are provided with oil ports 98 for lubrication of the journalled arm surfaces. As noted, the hollow shaft worm gear 84 is arranged to be coaxially mounted on an end portion of the drive shaft 52. The end plate 92 is positioned adjacent the end of the worm gear shaft 84 so as to enclose the latter as well as the drive shaft 52. The hollow shaft worm gear 84 is provided at one end thereof with an expansion plug 100, such as a Welsh plug. This plug 100 serves to prevent oil from leaking out and external fluid from entering. In this manner, the gear plate 92 is less likely to corrode. By virtue of the end plates 90, 92 being in combination with the worm gear housing 86, the entire worm gearing unit including worm and worm gear are enclosed around the drive shaft 52. Moreover, there is no need for a spur gear as is conventionally used with known motorized versions of fluid strainer apparatus. Clearly, with a motorized version, the cleaning operations of the screens 34 are automatic.

To convert from the motorized mode to a manual mode by virtue of the present invention, an operator need merely remove the end plate 90 from the end plate 70. Accordingly, the entire motorized unit 76 may be removed. Thereafter, a handwheel may be attached to a handwheel gear 52a.

Figure 4:
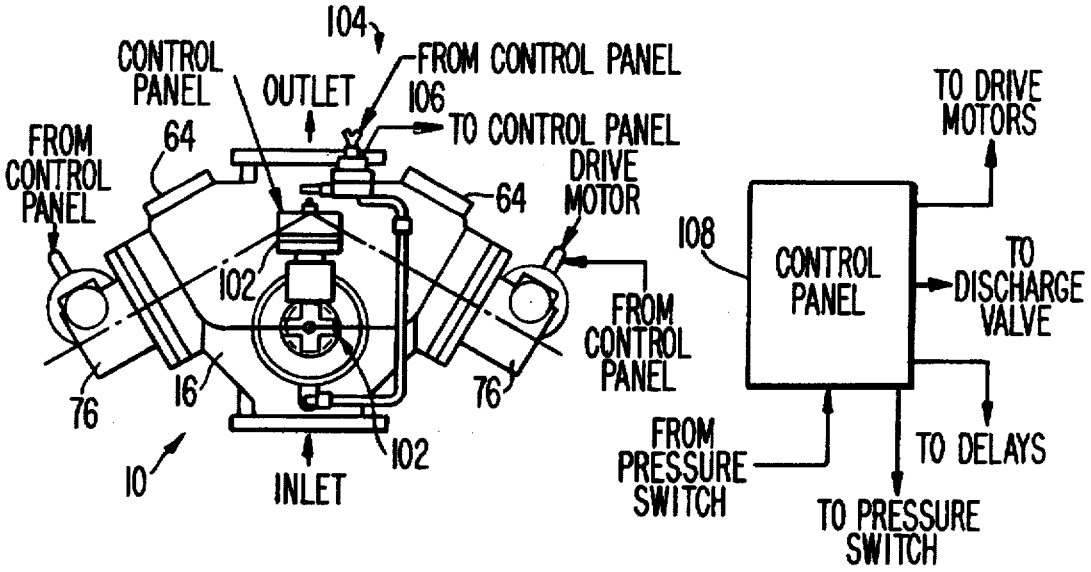
FIG. 4 is another illustrated embodiment of the present invention.
Figure 5:
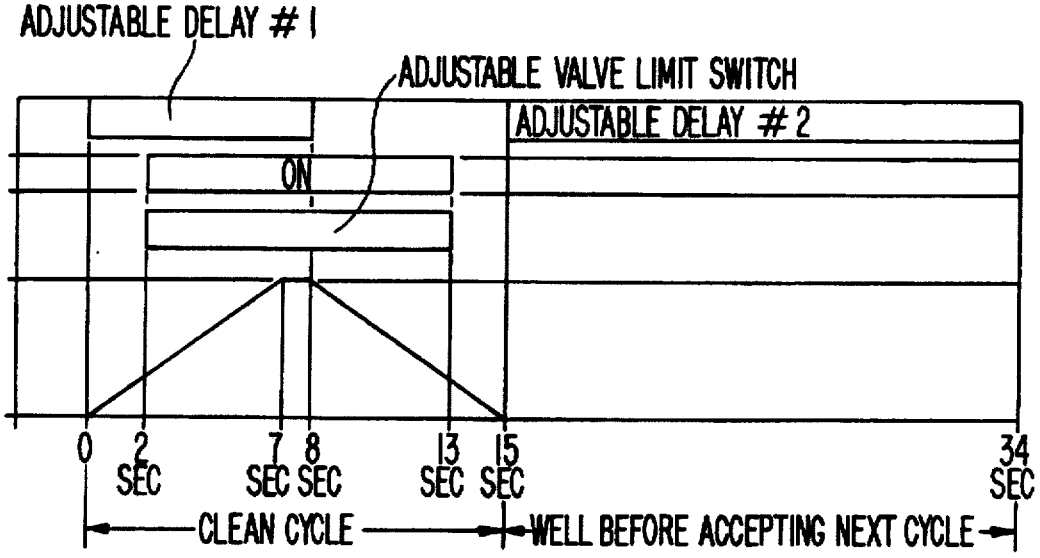
FIG. 5 represents a graph of an improved cleaning cycle.

Reference is now made to FIGS. 4 and 5 for disclosing an improved system for flushing the fluid strainer 10 in an automatic fashion. This embodiment is like the previous embodiment, but shows a motorized discharge valve 102 associated with the discharge instead of the manual valve 48. A known differential pressure switch system 104 has one end of its pipe connected to the valve outlet 20 while the other end is fluidly connected to the valve inlet 18. A differential pressure switch 106 in the system 104 will be actuated upon a preselected pressure differential existing between the inlet and outlet pressures, as is currently known in the art. Should a pressure differential exist which would actuate the switch 106, the motorized valve 102 is actuated through a control panel 108 for a preselected period of time. The enhanced cleaning cycle of the present invention is achieved by prolonging the turbulence created by having the discharge valve 102 open and substantially simultaneously rotating the screens 34. According to this embodiment, the screens 34 are rotatably driven substantially throughout period the discharge valve 102 is open (See FIG. 5). This prolonged turbulence virtually throughout the time the discharge valve is opened enhances waste discharge. Heretofore, the screens did not rotate during valve closing. Turbulence caused by the cleaning cycle as sensed by the switch 106 could restart the cleaning cycle. Thus unnecessary cleaning cycles are wasteful of the system fluid. However, the present invention adds a time delay to the operation of the switch 106 through the control panel 108 during the cleaning cycle, so that the switch is not sensitive to the turbulence and thus will not affect premature restart of the cleaning cycle even while the valve is closing.

According to the present invention it will be recognized that certain changes may be made in the abovedescribed improved fluid strainer and method of convening the same between motorized and manual modes without departing from the scope of the present invention herein involved. It is intended that all matter contained in this description and shown in the accompanying drawings shall be interpreted as illustrative and not in any limiting sense.

What is claimed is:

1. A fluid strainer apparatus adapted to be coupled to a fluid line for removing solid debris suspended in fluid travelling in the fluid line, said strainer comprising:

a housing assembly defining a sidewall of a chamber an inlet means couplable to the fluid line for supplying fluid to said strainer and at least an outlet means for discharging strained fluid from said housing assembly;

fluid strainer means including a screen rotatably mounted in said housing in said chamber adjacent said outlet means;

at least a scraper blade mounted in said housing assembly in such a manner that a scraping edge thereof is adjustable spaced in close proximity to said screen so as to remove solids from said screen when the latter is rotated relative to said edge;

said housing assembly including an inspection means defined by a sealable opening in said sidewall communicating with said chamber, said opening being sealingly closed by an enclosure means, said opening being sized and located so as to enable removal of said enclosure means to open said opening, removal of debris from said screen and said housing assembly and adjustment of said adjustably mounted scraping blade so that the spacing of said blade edge from said screen can be adjusted.

2. The strainer of claim 1 wherein said enclosure means has a portion which sealingly fits snugly in said opening and includes an O-ring on a periphery of said portion so as to seal said inspection opening.

3. A fluid strainer apparatus adapted to be coupled to a fluid line for removing solid debris suspended in fluid travelling in the fluid line, said strainer comprising:

a housing assembly defining an inlet means couplable to the fluidline and at least an outlet means for discharging the fluid;

fluid straining means rotatably mounted adjacent said outlet means in said housing assembly;

at least a scraper blade mounted in said housing assembly in such a manner that a scraping edge is in close proximity to said straining means so as to remove solids therefrom when the latter is rotated relative to said edge;

said straining means including a cylindrical screen rotatably mounted in said housing assembly, a rotatable drive shaft journalled in said housing assembly and coupled to said screen so as to rotate said screen in response to rotation of said shaft;

motor means releasably coupled to said apparatus and operable for rotatably driving said shaft and said screen so that said scraper blade can clean said screen;

said motor means includes a gear housing comprising a motorized worm gearing unit having a worm rotatably driven by a drive motor, a hollow shaft worm gear in said housing meshingly engages said worm, said worm gear being coaxially coupled to and rotatable with said drive shaft, said housing including a pair of gear plates each providing a journalled surface extending towards each other for rotatably supporting said worm gear for rotation, at least one of said gear plates being threadedly connected to said housing assembly; and one of said plates enclosing an end of said hollow worm gear, wherein said gear housing completely encloses said drive shaft.

4. The fluid strainer of claim 3 further including sealing means housed in an open end of said hollow worm gear for sealingly protecting said worm and said worm gear.

5. The fluid strainer of claim 4 wherein said strainer housing assembly includes an enlarged opening which facilitates manual removal of debris from said screen and also allows adjustment of said scraping blade so as to adjust the spacing of said blade edge from said screen.

6. The fluid strainer of claim 3 wherein one of said gear plates of said gear housing is removably attached to said strainer housing assembly.

7. A method of converting a fluid strainer from manual operation to motorized operation comprising the steps of:

providing a fluid strainer apparatus adapted to be coupled to a fluid line for removing solid debris suspended in the fluid, wherein the strainer comprises a housing assembly defining a fluid inlet means and at least an outlet means for discharging the fluid, a fluid straining means which includes a cylindrical screen rotatably mounted in the housing assembly, a rotatable drive shaft journalled in the housing assembly and coupled to the screen so as to rotate the screen in response to rotation of the drive shaft, and a handwheel attached to an end of the drive shaft protruding from the housing assembly;

removing the handwheel from the shaft;

attaching a motor means to the housing assembly wherein the motor means includes a motorized worm gear unit having a worm rotatably driven by a motor, a hollow shaft worm gear meshingly engaging and driven by the worm, wherein the worm gear shaft is keyed to the protruding end of the drive shaft so as to be coaxially coupled to and rotatable with the drive shaft and with a housing assembly completely enclosing the drive shaft.

8. A method of converting a fluid strainer from motorized operation to manual operation comprising the steps of:

providing a fluid strainer apparatus adapted to be coupled to a fluid line for removing solid debris suspended in the fluid, wherein the strainer comprises a housing assembly defining a fluid inlet means and at least an outlet means for discharging the fluid, a fluid straining means rotatably mounted in the housing assembly, a straining means which includes a cylindrical screen rotatably mounted in the housing assembly, a rotatable drive shaft journalled in the housing assembly and coupled to the screen so as to rotate the screen in response to rotation of the drive *shaft;* providing a motor means attached to an end of the drive shaft extending from the housing assembly wherein the motor means includes a motorized worm gear unit having a worm rotatably driven by a motor, a hollow shaft worm gear meshingly engaging and driven by the worm, with the worm gear shaft being keyed to the protruding end of the drive shaft so as to be coaxially coupled to and rotatable with the drive shaft and with a housing assembly completely enclosing the drive shaft;

removing the motor means from the drive shaft; and, attaching a handwheel to the protruding end of the drive shaft.

9. In a method of automatically flushing a fluid strainer having a pressure sensitive switch operable for monitoring pressure differentials between a fluid inlet and a fluid outlet, wherein the strainer has a motorized rotatable screen and a scraping blade in close proximity therewith, and a motorized discharge valve operable for opening and closing a discharge outlet comprising the steps of:

rotating the screen substantially throughout the opening and closing of the discharge valve;

and rendering inoperative the pressure sensitive switch during opening and closing of the discharge valve as well as for a preselected time period after closing of the discharge valve so that the switch does not operate to restart another discharge valve opening.

*10. A method of converting a fluid strainer form manual operation to motorized operation comprising the steps of:*

*providing a fluid strainer apparatus adapted to be coupled to a fluid line for removing solid debris suspended in the fluid, wherein the strainer comprises a housing assembly defining a fluid inlet means and at least an outlet means for discharging the fluid, a fluid straining means which includes a cylindrical screen rotatably mounted in the housing assembly, a rotatable drive shaft journalled in the housing assembly and coupled to the screen so as to rotate the screen in response to rotation of the drive shaft, and a handwheel attached to an end of the drive shaft protruding from the housing assembly;*

*removing the handwheel from the shaft; and*

*attaching a motor means to the housing assembly wherein the motor means includes a motorized gear unit including a driving gear rotatably driven by a motor and being in meshing engagement with a driven gear, said driven gear including a passage for coaxially receiving a portion of the drive shaft protruding from the housing assembly, said driven gear being coupled to and rotatable with the drive shaft and with an additional housing assembly enclosing the drive gear, the driven gear, and the portion of the drive shaft protruding from the housing assembly and coaxially received by the passage of the driven gear.*

*11. A method of converting a fluid strainer from motorized operation to manual operation comprising the steps of:*

*providing a fluid strainer apparatus adapted to be coupled to a fluid line for removing solid debris suspended in the fluid, wherein the strainer comprises a housing assembly defining a fluid inlet means and at least an outlet means for discharging the fluid, a fluid straining means rotatably mounted in the housing assembly, a straining means which includes a cylindrical screen rotatably mounted in the housing assembly, a rotatable drive shaft journalled in the housing assembly and coupled to the screen so as to rotate the screen in response to rotation of the drive shaft;*

*providing a motor means attached to an end of the drive shaft that extends from the housing assembly wherein the motor means includes a motorized gear unit including a driving gear rotatably driven by a motor and being in meshing engagement with a driven gear, said driven gear including a passage for coaxially receiving*

*a portion of the end of the drive shaft extending from the housing assembly, said driven gear being coupled to and rotatable with the drive shaft and with an additional housing assembly enclosing the drive gear, the driven gear, and the portion of the end of the drive shaft extending from the housing assembly and coaxially received by the passage of the driven gear;*

*removing the motor means from the drive shaft; and*

*attaching a handwheel to the protruding end of the drive shaft.*

*12. A fluid strainer apparatus adapted to be coupled to a fluid line for removing solid debris suspended in fluid travelling in the fluid line, said strainer comprising:*

*a housing assembly defining an inlet means coupled to the fluid line and at least an outlet means for discharging the fluid;*

*fluid straining means rotatably mounted adjacent said outlet means in said housing assembly;*

*at least a scraper blade mounted in said housing assembly in such a manner that a scraping edge is in close proximity to said straining means so as to remove solids therefrom when the latter is rotated relative to said edge;*

*said straining means including a cylindrical screen rotatably mounted in said housing assembly, a rotatable drive shaft journalled in said housing assembly and coupled to said screen so as to rotate said screen in response to rotation of said shaft;*

*motor means releasably coupled to said apparatus and operable for rotatably driving said shaft and said screen so that said scraper blade can clean said screen;*

*said motor means includes a gear housing comprising a motorized gearing unit including a driving gear in meshing engagement with a driven gear, said driving gear being driven by a drive motor and said driven gear including a passage for receiving the drive shaft therein, said driven gear being coaxially coupled to and rotatable with the drive shaft, said gear housing having spaced-apart plates, said plates having inwardly directed journalled surfaces for rotatably supporting the driven gear, at least one of the plates being connected to the housing assembly through detachable connecting means.*

* * * * *